(12) United States Patent
Wiegner

(10) Patent No.: US 11,834,080 B2
(45) Date of Patent: Dec. 5, 2023

(54) COMFORT VENTILATION FOR A SANITARY MODULE FOR A VEHICLE

(71) Applicant: Siemens Mobility GmbH, Munich (DE)

(72) Inventor: Rainer Wiegner, Spenge (DE)

(73) Assignee: Siemens Mobility GmbH, Munich (DE)

( * ) Notice: Subject to any disclaimer, the term of this patent is extended or adjusted under 35 U.S.C. 154(b) by 0 days.

(21) Appl. No.: 17/919,334

(22) PCT Filed: Apr. 13, 2021

(86) PCT No.: PCT/EP2021/059495
§ 371 (c)(1),
(2) Date: Oct. 17, 2022

(87) PCT Pub. No.: WO2021/209414
PCT Pub. Date: Oct. 21, 2021

(65) Prior Publication Data
US 2023/0143478 A1  May 11, 2023

(30) Foreign Application Priority Data

Apr. 17, 2020 (DE) .................. 10 2020 204 916.5

(51) Int. Cl.
*B61D 27/00* (2006.01)

(52) U.S. Cl.
CPC .................. *B61D 27/009* (2013.01)

(58) Field of Classification Search
CPC .................................. B61D 27/009
USPC .......................................... 454/70
See application file for complete search history.

(56) References Cited

U.S. PATENT DOCUMENTS

| | | | |
|---|---|---|---|
| 9,809,312 B2 | 11/2017 | Reiss et al. | |
| 11,085,658 B1 * | 8/2021 | Weems | .......... F24F 11/61 |
| 2018/0050122 A1 | 2/2018 | Lin et al. | |

FOREIGN PATENT DOCUMENTS

| | | | | |
|---|---|---|---|---|
| BR | PI0800410 A2 | 12/2010 | | |
| CA | 2642013 A1 * | 8/2007 | .......... | F24C 15/2021 |
| DE | 270822 A3 | 8/1989 | | |
| DE | 69201322 T2 | 7/1995 | | |
| DE | 202007012442 U1 | 12/2007 | | |
| DE | 102012003008 A1 | 8/2013 | | |
| DE | 102015210475 A1 * | 12/2016 | .......... | B61D 27/009 |
| EP | 0509503 B1 | 2/1995 | | |
| EP | 2175208 A1 | 4/2010 | | |

OTHER PUBLICATIONS

"Vehicle Sanitary With Intelligent Automatic Control", TXPMTEA, BRPI080041 0A2, EPO, p. 1-4, Jul. 22, 2021.

* cited by examiner

*Primary Examiner* — Allen R. B. Schult
(74) *Attorney, Agent, or Firm* — Laurence A. Greenberg; Werner H. Stemer; Ralph E. Locher

(57) ABSTRACT

A passenger transport vehicle, such as a rail vehicle, has at least one sanitary module and at least one fan for conveying waste air from the sanitary module. A control unit controls the volumetric flow of waste air from the sanitary module. The control unit is formed for at least two volumetric flows of waste air, which differ from one another and differ from zero. The volumetric flows are conveyed by the at least one fan, at least on the basis of a state of the sanitary module.

12 Claims, 1 Drawing Sheet

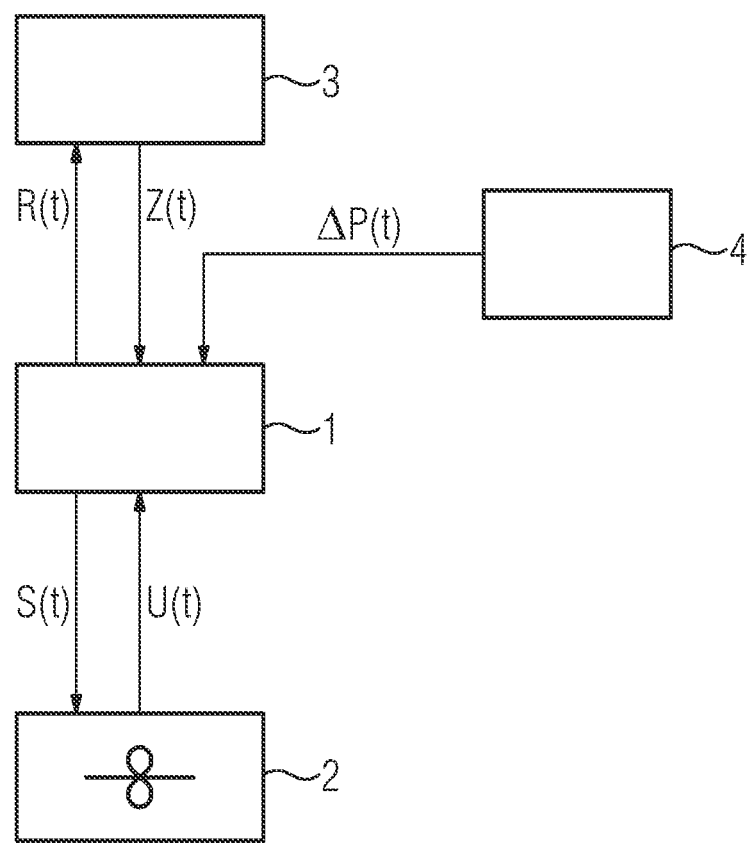
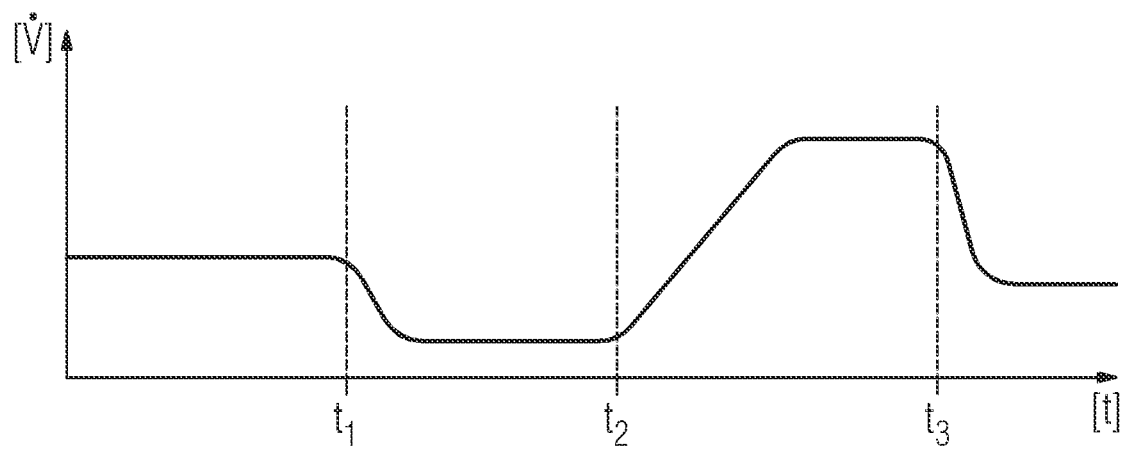

COMFORT VENTILATION FOR A SANITARY MODULE FOR A VEHICLE

SPECIFICATION

Field and Background of the Invention

SUMMARY OF THE INVENTION

The invention relates to a passenger-transport vehicle having at least one sanitary module and at least one fan for feeding waste air out of the sanitary module, and also to a method for controlling the volumetric flow.

Sanitary modules in large-capacity vehicles, in particular rail vehicles, are usually of windowless design and air-conditioned, but at least provided with a ventilation system for supplying fresh air and for removing waste air. In order to meet predetermined climatic requirements, in particular in regional rail transport, i.e. in particular at rail-vehicle speeds below 160 km/h, the waste air of a sanitary module can be guided out of the railcar body of the rail vehicle separately via a fan.

This gives rise to a negative pressure in the sanitary module, as a result of which air is taken in via defined openings, e.g. in the door or beneath the door, from a space in front of the sanitary module. This air, which the air-conditioning system, depending on the weather, heats up or cools, is intended to meet the standard wetroom-interior temperature required. It is a further requirement that unpleasant odors emanating from the sanitary module have to be prevented. This is usually achieved by the waste air being removed, which generates a low negative pressure within the sanitary module in relation to the space in front of the sanitary module. This negative pressure is achieved by a fan which feeds the waste air out of the wetroom. The fan here is set to a fixed operating point on the basis of predetermined, so-called air-exchange rates, depending on the volume of the sanitary module itself being dimensioned, for example, between 100 and 200 m$^3$/h. This fixed operating point of the fan is effective for all climatic and pressure-dependent situations in the railcar body. Pressure fluctuations, e.g. brought about by the air-conditioning system, train movements or opened entry doors, are therefore not taken into account.

The object of the invention is to improve the ventilation for a sanitary module of a rail vehicle.

The object is achieved by the subjects of independent patent claims. Developments and configurations of the invention can be found in the features of the dependent patent claims.

A passenger-transport vehicle according to the invention, in particular a rail vehicle, in particular for regional passenger transport, comprises at least one sanitary module and at least one fan for feeding, and therefore for removing, waste air out of the sanitary module. The vehicle also comprises, according to the invention, a closed-loop-control unit for controlling a fan-fed volumetric flow of waste air, which closed-loop-control unit is designed so that at least two volumetric flows of waste air which differ from one another and are other than zero, and are fed by the fan, are controlled by it at least in dependence on a state of the sanitary module.

The closed-loop-control unit is suitably designed to control the fan-fed volumetric flow of waste air at least in dependence on a state of the sanitary module. The fan-fed volumetric flow of waste air out of the sanitary module here is adjusted by the closed-loop-control unit, in dependence on the state of the sanitary module, to at least two values which differ from one another and are other than zero. In other words, said volumetric flow is controlled by the closed-loop-control unit such that, over an operating period of the vehicle, it can assume at least two different values, each of them not equal to zero, in dependence on the respective state of the sanitary module.

A method according to the invention for operating a vehicle according to the invention correspondingly comprises the following method steps:
  a. a state of the sanitary module is determined;
  b. at least two volumetric flows of waste air out of the sanitary module which differ from one another and are other than zero, and are fed by the fan, are controlled, in particular by means of the closed-loop-control unit, at least in dependence on the determined state of the sanitary module.

For the purpose of determining the state of the sanitary module, the vehicle has at least one sensor or a plurality of sensors—arranged in particular in, on or in the immediate vicinity of the sanitary module—for the purpose of sensing relevant measured values relating to measured variables for describing the state of the sanitary module.

For the purpose of controlling the fan-fed volumetric flow, use is made of the closed-loop-control unit, which, for its part, is correspondingly designed at least to perform the method steps a. and b. In particular, it is suitably designed to receive, to process and to evaluate the measured values and to determine the state of the sanitary module in dependence on at least one of these measured values. The closed-loop-control unit comprises means which are suitable for performing the respective method step.

For the purpose of receiving the measured values, in particular in the form of sensor signals, the closed-loop-control unit can have a receiving module.

The closed-loop-control unit can also have a computing unit for determining a control variable and can also have an actuator for outputting a manipulated variable to the fan. Correspondingly, the closed-loop-control unit then has a suitable output unit for outputting the manipulated variable to the fan and also has a suitable connection to the fan. A controller typically transmits a control variable to an actuator, which for its part transmits the manipulated variable to the controlled system. The closed-loop-control unit, in this case, can incorporate the actuator. The value of the volumetric flow can be predetermined as a reference value (setpoint value) in dependence on the state of the sanitary module and can be kept in a memory of the closed-loop-control unit. The current value of the volumetric flow (controlled variable) can likewise be sensed directly, in particular by means of suitable sensors, as a measured value or can be determined indirectly on the basis of further parameters, for example on the basis of known fan parameters, e.g. the geometrical dimensions of the fan, and also on the basis of the current fan speed. The fixed parameters here can likewise be stored in the memory of the closed-loop-control unit. The variable parameters, for example in the form of measured values, are, in turn, suitably transmitted to the closed-loop-control unit for further processing.

The fan is advantageously of controllable design. For example, it has fan blades of which the angles can be adjusted. According to a simpler variant, however, the fan has fixed fan blades. In particular then, it is possible to vary a speed of the fan, in particular it is possible to adjust the speed in a stepless manner in a predetermined range, for example between 0 and a predetermined maximum speed of the fan.

According to an advantageous development, the closed-loop-control unit is designed to control the speed of the fan, in particular so that at least two speeds of the fan which differ from one another and are other than zero are controlled by it at least in dependence on a state of the sanitary module. As already explained, the fan can be designed such that its fan speed can be varied, in particular in a stepless manner, in a predetermined range, for example between 0 and a predetermined maximum speed of the fan, for example 10 000 rpm. For the purpose of controlling the fan-fed volumetric flow of waste air, correspondingly, the speed of the fan is controlled by the closed-loop-control unit at least in dependence on a state of the sanitary module. The closed-loop-control unit is suitably designed, and suitably connected to the controllable fan, so as to generate a manipulated variable for controlling the speed of the fan in dependence on the state of the sanitary module and to output this variable to the fan. The speed of the fan here is adjusted to at least two values which differ from one another and are other than zero and represent the fan-fed volumetric flow of waste air out of the sanitary module. The volumetric flow of waste air out of the sanitary module therefore, rather than being controlled directly, is controlled indirectly by way of the speed of the fan being controlled.

If the volumetric flow, rather than being monitored directly, is likewise derived from the speed of the fan, then it is possible for the manipulated variable, reference variable and controlled variable each to represent the speed of the fan directly and the volumetric flow indirectly.

A further development of the invention consists in the closed-loop-control unit being designed so that the fan-fed volumetric flow of waste air is controlled by it in a stepless manner in a predetermined range. It is possible here, once again, for the speed of the fan to be controlled in a stepless manner within the predetermined range, for example between 0 and a predetermined maximum speed of the fan.

The volumetric flow of waste air out of the sanitary module is controlled by the closed-loop-control unit, in particular by way of the fan speed being controlled, such that, over an operating period of the vehicle, it can assume the value zero and also at least two, but in particular more than two, different values, each of them not equal to zero, in dependence on the respective state of the sanitary module. The state can be described, for example, by means of a value in a predetermined range. The volumetric flow is correspondingly predetermined as a function of the state.

According to one embodiment, the speed of the fan can be controlled in dependence on the shape and size of the fan.

The fan-fed volumetric flow of waste air out of the sanitary module can be controlled, in particular in a stepless manner, in a predetermined range, in particular from 0 m³/h to 100 m³/h, in particular from 100 m³/h to 50 m³/h, in particular from 50 m³/h to 200 m³/h. The fan and closed-loop-control unit are then suitably designed in accordance with the size of the sanitary module—usually two types of sanitary module are constructed: standard wetrooms and/or (accessible) universal wetrooms.

For the purpose of monitoring the speed of the fan, a development provides for a speed sensor, in particular a tachogenerator. As an alternative, it is possible to use an incremental encoder, for example a Hall sensor, for the purpose of monitoring the speed of the fan. Accordingly, the speed sensor is suitably arranged on the fan. A controlled variable in the form of the signal from the speed sensor, for example the tachometer voltage, this signal representing the current speed of the fan and therefore, indirectly, the fan-fed volumetric flow, can be transmitted to the closed-loop-control unit and processed further by the same.

For the purpose of controlling the speed of the fan, according to a further development, a manipulated variable in the form of a voltage output to the fan from the closed-loop-control unit, for example a direct voltage or a pulse-width-modulated voltage signal, is controlled at least in dependence on the state of the sanitary module, that is to say is increased or decreased as required. The fan-generated tachometer voltage allows direct monitoring of the speed of the fan wheel or of the fan function, that is to say also malfunctioning. The resulting volumetric flow provides for an operating point on the system curve. This operating point serves as a control-starting point, as a result of which it is possible to adjust the fan speed and, correspondingly, the volumetric flow in the event of possible changes in pressure or comfort-related adaptations. The monitoring of the volumetric flow therefore allows for increased comfort in respect of the air quality in the sanitary module.

In the case of different pressure conditions in the railcar body, caused by the status of the air-conditioning system (e.g. cooling mode, heating mode, recirculated-air mode), by leaks in the railcar body associated with the train speed, instances of the train passing through tunnels, opened exterior doors, etc., it is possible to adjust or set a defined quantity of waste air. It can thus be ensured that any possible unpleasant odors emanating from the WC system in relation to the space in front of the sanitary module are prevented. It is also possible to reduce excessive noise from developing from the outgoing-air fan via adaptation of the speed, in particular by way of the speed being reduced while the sanitary module is being used by a passenger. The control parameter used in this example, inter alia, is the presence of a person using the sanitary module.

A further possible way of improving the comfort for the passenger would be additional temperature monitoring of the flow of waste air. Using this parameter, the closed-loop-control unit could control corresponding preset temperature requirements. A further parameter for control by means of the closed-loop-control unit could be an odor sensor in the air flow of the fan, this odor sensor increasing the volumetric flow as required.

The usually fixed operating point of the fan, which brings about a constant volumetric flow of waste air irrespective of external conditions, can be monitored by the use of a controllable fan which outputs its current speed, for example via the so-called tachometer voltage. The operating point on the system curve can be controlled as required by means of the closed-loop-control unit, as a result of which direct control of the fan function and indirect monitoring of the volumetric flow take place.

As already explained in detail, the fan-fed volumetric flow of waste air is controlled at least in dependence on a state of the sanitary module. For the purpose of describing the state, a number of influencing factors can be monitored and correspondingly sensed or determined.

The invention makes provision for a presence of a person using the sanitary module to be monitored for the purpose of describing the state of the sanitary module. For this purpose, it is, in particular, sensed whether a door to the sanitary module has been locked from the inside. The fan-fed volumetric flow of waste air is controlled at least in dependence on a locking state of a door of the sanitary module. Accordingly, the closed-loop-control unit is suitably designed so that the fan-fed volumetric flow of waste air is regulated by it at least in dependence on the locking state of the door of the sanitary module. A correspondingly suitable means for sensing the locking state of the door of the sanitary module is suitably connected to the closed-loop-control unit. It is therefore possible for the fan speed to be lowered when the door has been locked from the inside, that is to say in the presence of a person using the sanitary module, so that the noise level in the sanitary module is decreased and therefore the passenger's comfort is increased. If, in contrast, the door has been closed, but not locked, the air speed can be raised in order to allow a high level of air exchange. This advantageously takes place over a predetermined period of time after use of the sanitary module has been sensed. An opened door could, in turn, be associated with differing control. Alongside the situation where active use of the sanitary module by a passenger is sensed, it is also possible for a situation where the sanitary module is taken out of service, for example by a train conductor, to be sensed and taken into account in the control of the volumetric flow. The sanitary module can then assume at least the following states: "not in use", "in use", and possibly "out of service".

It is also the case that the fan-fed volumetric flow of waste air out of the sanitary module is controlled, according to a further development, in dependence on a duration over which a fan-fed volumetric flow of waste air out of the sanitary module remains unchanged. Accordingly, the closed-loop-control unit is suitably designed so that the fan-fed volumetric flow of waste air is regulated by it, in addition, in dependence on a duration over which a fan-fed volumetric flow of waste air out of the sanitary module remains unchanged.

If, for example, the fan speed is increased after a vehicle passenger visits, in particular actively uses, the sanitary module, and therefore also the fan-fed volumetric flow of waste air out of the sanitary module is increased, it is possible, once a predetermined period of time following this use has been reached and if there are no other changes in state of the sanitary module, for the volumetric flow to be decreased again and the speed of the fan to be correspondingly reduced. Therefore, in addition to the already known parameters and influencing factors, all that is required is for the time or a time frame to be measured. Since the fan-fed volumetric flow as such and also the duration of the fan-fed volumetric flow are known, then, it is thus possible to determine the volume of waste air fed out of the sanitary module, for example since a previous change in the fan-fed volumetric flow of waste air. Control can thus take place indirectly in dependence on the volume fed since the previous change in the fan-fed volumetric flow of waste air.

According to a development, further measured values relating to physical measured variables for the purpose of describing the state of the sanitary module can be:
the air pressure in the sanitary module, in particular sensed by means of a pressure sensor;
the temperature in the sanitary module or in the waste-air line, in particular sensed by means of a temperature sensor;
the air quality in the sanitary module, in particular the odor, in particular sensed by means of an odor sensor;
the noise level within the sanitary module, in particular caused by the fan, in particular sensed by means of a noise-level sensor.

The state of the sanitary module can be described by one or more parameters or influencing factors. As a development, the volumetric flow can be controlled, in addition, in dependence on measured values relating to one or more of the aforementioned measured variables. In respect of the parameters, measured values are sensed and communicated to the closed-loop-control unit and processed further by the same. Influencing factors, for example the wetroom being taken out of service by a train conductor, can also be predetermined manually.

The fan-fed volumetric flow of waste air out of the sanitary module can also be controlled, in addition, in dependence on further parameters which are independent of the state of the sanitary module. As a development, further measured values relating to physical measured variables which can be sensed independently of the sanitary module can be:
the pressure in a space in front of the sanitary module or the ambient pressure outside the rail vehicle, in particular sensed by means of a pressure sensor;
the temperature in a space in front of the sanitary module or the ambient temperature outside the rail vehicle, in particular sensed by means of a temperature sensor;
the speed of the rail vehicle, in particular sensed by means of a tachometer;
the air quality outside the sanitary module, in particular the odor, in particular sensed by means of an odor sensor;
the noise level outside the sanitary module, in particular caused by the fan, in particular sensed by means of a noise-level sensor.

As a development, the volumetric flow can be controlled, in addition, in dependence on measured values relating to one or more of the aforementioned measured variables. Accordingly, the closed-loop-control unit is suitably designed and connected to the corresponding measuring sensors for the purpose of communicating the measured values.

Furthermore, the closed-loop-control unit can also be connected to a central control device of the vehicle for the purpose of communicating influencing factors or parameters.

Such influencing factors can be, for example, information relating to opened exterior doors of the vehicle, instances of the train passing through tunnels or relating to the status of a central air-conditioning system (e.g. cooling mode, heating mode, recirculated-air mode) of the vehicle and/or of the sanitary module.

In a further development of the invention, the closed-loop-control unit is designed so that the fan-fed volumetric flow of waste air is controlled by it at least in dependence on a state of the sanitary module and in dependence on at least one measured value relating to at least one physical measured variable and sensed independently of the state of the sanitary module.

An advantageous configuration of the invention can be seen in the fact that the closed-loop-control unit is suitably designed so that the fan-fed volumetric flow of waste air out of the sanitary module is controlled by it at least in dependence on a state of the sanitary module, in particular on the locking state of the door of the sanitary module, and in dependence on a pressure difference between the interior space of the sanitary module and a space in front of the sanitary module. Accordingly, the fan-fed volumetric flow of waste air out of the sanitary module is controlled in dependence on a pressure difference between the interior space of the sanitary module and a space in front of the sanitary module. The pressure difference between the sanitary module and the space in front of the sanitary module can be sensed by means of a differential-pressure sensor or can be determined by means of two pressure sensors, one each in the space in front of the sanitary module and in the sanitary module itself. This is relevant, in particular, in the case of railcar-body leaks, which, in conjunction with a significantly changing train speed or with instances of the train passing through tunnels, can result in pressure fluctuations in the vehicle.

According to a further development, a waste-air line, through which the waste air is fed out of the sanitary module by means of the fan, is free of a throttle element. Accordingly, control of the volumetric flow of waste air out of the sanitary module by the waste-air line takes place exclusively by way of the controllable fan, in particular the speed thereof, being controlled at least in dependence on the determined state of the sanitary module. So-called volumetric-flow controllers are known for the purpose of controlling volumetric flows. Volumetric-flow controllers are controllable throttle elements for the purpose of releasing and of limiting a volumetric flow in a line. This development dispenses with a throttle element, and the control thereof, for the purpose of controlling the volumetric flow of waste air. The volumetric flow of waste air is increased or decreased solely by the controlled fan. The line for removing the waste air out of the sanitary module here runs between an opening of the line toward the sanitary module, that is to say toward the interior space of the sanitary module, and an opening of the line for discharging the waste air to the surroundings of the sanitary module, in particular of the vehicle. The fan can be arranged in the middle of the line or it is arranged in the region of the opening of the line toward the interior space of the sanitary module. The entire line, i.e. upstream and/or downstream of the fan, is free of a throttle device for controlling the volumetric flow of waste air through the line.

As a result of the intelligent control of outgoing air, the ventilation for a sanitary module of a vehicle, in particular of a rail vehicle, in particular for regional passenger transport, and/or the air conditioning of the vehicle are/is significantly more efficient, in particular more energy-efficient, and passenger comfort is increased at the same time.

BRIEF DESCRIPTION OF THE FIGURES

The invention permits numerous embodiments. It will be explained in more detail on the basis of the following figures, which illustrate an exemplary embodiment and in which:

FIG. 1 shows, schematically, a logic flowchart relating to the control of a fan of a sanitary module, and FIG. 2 shows a progression of the volumetric flow of the fan over time and/or different use states of the sanitary module.

DETAILED DESCRIPTION OF THE INVENTION

FIG. 1 illustrates a flow diagram which depicts, schematically, a sequence in which the method according to the invention takes place.

A closed-loop-control unit 1 is coupled to a control unit 3 of a sanitary module, which, for its part, is coupled to a locking device of a door of the sanitary module. The closed-loop-control unit 1 reports back, to the control unit 3, a status R, for example "in use", "not in use" or "out of service". Furthermore, it would also be possible to report back a volumetric flow V of waste air out of the sanitary module which is currently being fed by a fan 2 regulated by the closed-loop-control unit 1. The control unit 3 of the sanitary module, in turn, sends the closed-loop-control unit 1 reports relating to the state Z of the sanitary module. In the simplest case, this is information relating to a locking state of the door of the sanitary module, for example "open", "closed, but not locked" or "closed and locked from the inside". Furthermore, a state Z "sanitary module not in service" can also be reported to the closed-loop-control unit 1 by the control unit 3 of the sanitary module.

In addition to the state Z of the sanitary module, the closed-loop-control unit 1 also receives measured values P relating to a pressure difference between the interior space of the sanitary module and a space in front of the sanitary module. For the purpose of communicating the measured values P, the closed-loop-control unit 1 is connected to a differential-pressure sensor 4.

The closed-loop-control unit 1, then, is designed to control the controllable fan 2, in particular the speed thereof, in particular in a stepless manner, in dependence on the state Z and at least one measured value P relating to the pressure difference between the interior space of the sanitary module and a space in front of the sanitary module. For this purpose, the closed-loop-control unit 1 is suitably connected to the fan 2 for the purpose of a control signal S being communicated from the closed-loop-control unit to the fan 2. The aim is for the volumetric flow V of waste air out of the sanitary module which is fed by the fan 2 to be controlled in dependence on the state Z and at least one measured value P relating to the pressure difference between the interior space of the sanitary module and a space in front of the sanitary module. Control here is such that it can assume at least two volumetric flows V of waste air out of the sanitary module which differ from one another and are other than zero, and are fed by the fan 2. The fan 2 here is adjusted to at least two speeds which differ from one another and are other than zero. Furthermore, the volumetric flow V, logically, can also, in addition, be zero, in particular when the fan is not operating.

For the purpose of monitoring the speed of the fan, a speed sensor of the fan 2 is connected to the closed-loop-control unit 1, the speed sensor reporting back to the closed-loop-control unit 1 for example a tachometer voltage U in dependence on the speed n.

In addition to the state of the sanitary module and the differential-pressure signal, it would be possible for further measured values relating to other parameters to be incorporated, in addition, in the control.

FIG. 2, then, shows the fan-fed volumetric flow V of waste air out of the sanitary module progressing typically over the time t of a use period. The speed progression would be qualitatively identical.

In the first instance, the sanitary module is not in use. The fan-fed volumetric flow V of waste air out of the sanitary module is a pre-set value for the purpose of maintaining a predetermined pressure difference between the interior space of the sanitary module and a space in front of the sanitary module.

At the point in time $t_1$, a passenger enters the sanitary module and locks the door thereof from the inside. To increase comfort, the fan speed and the volumetric flow V are then reduced to a minimum. This causes the noise level in the sanitary module to decrease.

At the point in time $t_2$, the passenger leaves the sanitary module again, which means that the sanitary module, once again, is not in use. Following use, the fan speed and the volumetric flow V of waste air are significantly increased by the closed-loop-control unit so that a situation where the air in the sanitary module is exchanged as completely as possible is quickly established. If, at the point in time $t_3$, the fed volume of waste air reaches a predetermined limit value, the fan-fed volumetric flow V, in particular the fan speed, is decreased again. This is done, once again, to the pre-set value for the purpose of maintaining the predetermined pressure difference between the interior space of the sanitary module and the space in front of the sanitary module.

The invention claimed is:

1. A passenger-transport vehicle, comprising:
a sanitary module having an interior space and a space in front of the sanitary module;
at least one fan for conveying waste air out of said sanitary module; and
a closed-loop-control unit for controlling said at least one fan to generate a fan-fed volumetric flow of the waste air;
said closed-loop-control unit being configured to control a generation by said at least one fan of at least two volumetric flows of waste air, which differ from one another and which are different from zero;
said closed-loop-control unit being configured to control the generation of the fan-fed volumetric flow of waste air in dependence on a pressure in the interior space of the sanitary module and/or in dependence on a pressure in the space in front of the sanitary module;
said closed-loop-control unit being configured to control the generation of the fan-fed volumetric flow of waste air in dependence on a presence of a person using the sanitary module and in dependence on a locking state of a door of said sanitary module; and
said closed-loop-control unit reducing the generation of the fan-fed volumetric flow of waste air while the door of said sanitary module is locked from inside said sanitary module.

2. The vehicle according to claim 1, wherein said closed-loop-control unit is configured to control a speed of said at least one fan.

3. The vehicle according to claim 2, further comprising a speed sensor for monitoring the speed of said at least one fan.

4. The vehicle according to claim 1, wherein said closed-loop-control unit is configured to control the volumetric flow of waste air generated by said at least one fan steplessly within a predetermined range.

5. The vehicle according to claim 1, wherein said closed-loop-control unit is further configured to control the fan-fed volumetric flow of waste air out of said sanitary module in dependence on a duration over which the fan-fed volumetric flow of waste air out of said sanitary module remains unchanged.

6. The vehicle according to claim 1, wherein said closed-loop-control unit is further configured to control the fan-fed volumetric flow of waste air out of said sanitary module in dependence on at least one parameter selected from the group consisting of a temperature in said sanitary module, a temperature of the fan-fed waste air, an odor in said sanitary module, and a noise level in said sanitary module.

7. The vehicle according to claim 1, further comprising a waste-air line for conducting the waste air out of said sanitary module, said waste-air line being free of a throttle element.

8. A method of operating a vehicle, the method comprising:
providing a passenger-transport vehicle according to claim 1;
determining a state of the sanitary module in the vehicle and thereby monitoring for a presence of a person using the sanitary module for describing a state of the sanitary module;
controlling a fan-fed volumetric flow of waste air out of the sanitary module at least in dependence on the determined state, with the fan-fed volumetric flow of waste air out of said sanitary module being controlled in dependence on the presence of a person using said sanitary module and a locking state of a door of said sanitary module and, in addition, in dependence on at least one of a pressure in the interior space of the sanitary module or a pressure in a space in front of the sanitary module; and
reducing the generation of the fan-fed volumetric flow of waste air while the door of the sanitary module is locked from inside the sanitary module.

9. The method according to claim 8, wherein the passenger transport vehicle is a rail vehicle.

10. The method according to claim 8, wherein the step of controlling the fan-fed volumetric flow of waste air out of said sanitary module comprises controlling the volumetric flow in dependence on a duration over which a fan-fed volumetric flow of waste air out of said sanitary module remains unchanged.

11. The method according to claim 8, wherein the step of controlling the fan-fed volumetric flow of waste air out of said sanitary module further comprises controlling the volumetric flow in dependence on at least one parameter selected from the group consisting of a temperature in said sanitary module, a temperature of the fan-fed waste air, an odor in said sanitary module, and a noise level in said sanitary module.

12. The method according to claim 8, wherein the step of controlling the fan-fed volumetric flow of waste air out of said sanitary module comprises controlling the volumetric flow exclusively by controlling a speed of the fan.

* * * * *